(12) United States Patent
Schneider et al.

(10) Patent No.: US 8,139,039 B2
(45) Date of Patent: Mar. 20, 2012

(54) SELECTIVELY ERASABLE ELECTRONIC WRITING TABLET

(75) Inventors: Tod L. Schneider, Kent, OH (US); Erica Montbach, Kent, OH (US); J. William Doane, Kent, OH (US)

(73) Assignee: Kent Displays, Incorporated, Kent, OH (US)

( * ) Notice: Subject to any disclaimer, the term of this patent is extended or adjusted under 35 U.S.C. 154(b) by 848 days.

(21) Appl. No.: 12/220,805

(22) Filed: Jul. 29, 2008

(65) Prior Publication Data

US 2009/0096942 A1 Apr. 16, 2009

Related U.S. Application Data

(63) Continuation-in-part of application No. 12/152,729, filed on May 16, 2008.

(60) Provisional application No. 60/962,625, filed on Jul. 31, 2007.

(51) Int. Cl.
G06F 3/041 (2006.01)
(52) U.S. Cl. .......................... 345/173; 349/12
(58) Field of Classification Search .................. 345/173, 345/174; 178/18.01–18.03, 18.05, 18.06; 349/12
See application file for complete search history.

(56) References Cited

U.S. PATENT DOCUMENTS

| 4,525,032 A | 6/1985 | Hilsum |
| 5,453,863 A | 9/1995 | West et al. |
| 5,594,562 A | 1/1997 | Sato et al. |
| 5,691,795 A | 11/1997 | Doane et al. |
| 5,847,798 A | 12/1998 | Yang et al. |
| 6,104,448 A | 8/2000 | Doane et al. |
| 6,268,839 B1 | 7/2001 | Yang et al. |

(Continued)

FOREIGN PATENT DOCUMENTS

JP 05053537 3/1993

(Continued)

OTHER PUBLICATIONS

International Search report for Appl. No. PCT/US2010/036175, Dec. 22, 2010.

*Primary Examiner* — Jimmy H Nguyen
(74) *Attorney, Agent, or Firm* — Pearne & Gordon LLP

(57) ABSTRACT

An electronic writing tablet is composed of one or more layers on which an image is formed and can be selectively erased. One aspect of the invention is a bistable cholesteric writing tablet on which an image is formed while applying writing pressure. The image can be fully erased and new images written on the tablet. In addition, one can selectively erase any or all portions of the written image to restore the original background color. Another aspect of the invention is a multi-color stacked writing tablet in which a color of an image is selected (usually by applying a suitable voltage) while applying writing pressure using an instrument such as an untethered stylus on the surface of the tablet. The writing tablet includes at least two or three stacked layers of bistable cholesteric liquid crystal material. Selected colors can be additively mixed to achieve intermediate colors as desired. The image can be fully erased and new images written on the tablet. In addition, one can selectively erase any or all portions of the written image to restore the original background color.

24 Claims, 7 Drawing Sheets
(4 of 7 Drawing Sheet(s) Filed in Color)

U.S. PATENT DOCUMENTS

| | | |
|---|---|---|
| 6,377,321 B1 | 4/2002 | Khan et al. |
| 6,473,072 B1 | 10/2002 | Comiskey et al. |
| 6,639,578 B1 | 10/2003 | Comiskey et al. |
| 6,730,862 B1 | 5/2004 | Gasparik |
| 6,753,933 B2 | 6/2004 | Cirkel et al. |
| 6,759,399 B1 | 7/2004 | Petit et al. |
| 6,811,815 B2 | 11/2004 | He et al. |
| 6,825,829 B1 | 11/2004 | Albert et al. |
| 6,999,061 B2 | 2/2006 | Hara et al. |
| 7,061,559 B2 | 6/2006 | Khan et al. |
| 7,136,048 B2 | 11/2006 | Yrjanainen et al. |
| 7,170,481 B2 | 1/2007 | Doane et al. |
| 7,242,394 B2 | 7/2007 | Lahade et al. |
| 7,245,483 B2 | 7/2007 | Feague et al. |
| 7,351,506 B2 | 4/2008 | Schneider et al. |
| 2003/0058227 A1 | 3/2003 | Hara et al. |
| 2003/0071754 A1 | 4/2003 | McEwan |
| 2003/0071958 A1* | 4/2003 | Wu et al. .................. 349/156 |
| 2003/0137496 A1 | 7/2003 | Stevens et al. |
| 2003/0156099 A1 | 8/2003 | Yrjanainen et al. |
| 2004/0140964 A1 | 7/2004 | Wang et al. |
| 2004/0159702 A1 | 8/2004 | Rosenfeld |
| 2004/0207606 A1 | 10/2004 | Atwood et al. |
| 2004/0263486 A1 | 12/2004 | Seni |
| 2005/0079386 A1 | 4/2005 | Brown, Jr. et al. |
| 2005/0104806 A1 | 5/2005 | Stephenson, III |
| 2005/0259055 A1* | 11/2005 | Ma .................................. 345/87 |
| 2006/0151601 A1 | 7/2006 | Rosenfeld |
| 2006/0204675 A1 | 9/2006 | Gao et al. |
| 2006/0262235 A1 | 11/2006 | Vogels et al. |
| 2006/0267955 A1 | 11/2006 | Hino |
| 2007/0026163 A1 | 2/2007 | Schneider et al. |
| 2007/0059901 A1 | 3/2007 | Majumdar et al. |
| 2007/0063939 A1 | 3/2007 | Bellamy |
| 2007/0237906 A1 | 10/2007 | Li et al. |
| 2007/0238080 A1 | 10/2007 | Lynch |
| 2007/0277659 A1 | 12/2007 | Schneider et al. |
| 2007/0285385 A1 | 12/2007 | Albert et al. |

FOREIGN PATENT DOCUMENTS

| | | |
|---|---|---|
| JP | 08035759 | 2/1996 |
| JP | 2001125108 | 5/2001 |
| JP | 2001334693 | 12/2001 |
| JP | 2002163070 | 6/2002 |
| JP | 2004331697 | 11/2004 |

* cited by examiner

SELECTIVELY ERASABLE ELECTRONIC WRITING TABLET

CROSS-REFERENCE TO RELATED APPLICATIONS

This application is a continuation-in-part of U.S. patent application Ser. No. 12/152,729 filed May 16, 2008, which benefits from the priority of U.S. Provisional Application No. 60/962,625 filed Jul. 31, 2007, both of which are incorporated herein by reference in their entireties.

FIELD OF THE INVENTION

The invention relates to devices that can be written on with a finger or using a stylus or blunt instrument and a method of erasing or editing the written image.

BACKGROUND OF THE INVENTION

There have been various technological approaches to produce a writing pad as a replacement of paper and pencil or chalk on slate. The best known examples are toys. The ETCH-A-SKETCH™, introduced in the 1960s, is one such device. In this device, a movable stylus removes a powder material from inside a screen to make a dark line. The image is erased by turning the device upside down and shaking it to smooth out the surface. Another famous example is the MAGNA DOODLE™, which is a magnetophoretic device in which a stylus with a magnet on the tip is used as the pen to draw a line. The device is erased with a thin long magnet behind the screen. Over 40 million of these devices have been reportedly sold.

Other writing pads have also been proposed. U.S. Pat. No. 4,525,032 to Hilsum is one such example where cholesteric or a smectic liquid crystal is used to provide a semi-permanent record of the path traced by a stylus on a display and used as a re-usable writing pad. According to Hilsum a layer of a liquid crystal material is contained between two substrates. A stylus having a tip contacts the front substrate and changes the state of selected areas of the liquid crystal layer at positions adjacent the pen tip to provide observable information corresponding to the pen movement. The pen may have a pointed tip, a heated tip, a light emitting tip, or a tip connected to a high voltage high impedance source. At least one substrate of the display can be deformable, thin, or flexible so that the liquid crystal layer may be changed from one state to another by localized application of pressure, heat, light, electrostatic charge, or an electric field. The resultant image on the display is erased by deformation of the layer, e.g. flexing, heating and cooling, or by an electrical field.

A practical problem with the Hilsum device is erasing the image. It is slow and inconvenient to heat or flex the device to erase the image. Hilsum discloses an electronic means of erasure using a special cholesteric liquid crystal in which the frequency of an AC field is applied to the stylus or electrodes. The frequency is changed to enable a writing state or an erasure state. However, this is not without problems in that crossover frequency between writing and erasing is strongly temperature dependent and the frequencies as well as the voltages are very high, consuming a lot of power causing very limited battery lifetime.

A considerable improvement was made with the discovery of bistable cholesteric liquid crystals (see U.S. Pat. No. 5,453,863). Cholesteric liquid crystalline materials are unique in their optical and electro-optical features. These materials possess a helical structure in which the liquid crystal (LC) director twists around a helical axis. The reflected light is circularly polarized with the same handedness as the helical structure of the LC. They can be tailored to Bragg reflect light at a preselected wavelength and bandwidth by controlling the pitch of the helical twist through the concentration of chiral dopants and the birefringence of the nematic host, respectively. If the incident light is not polarized, it will be decomposed into two circular polarized components with opposite handedness and one of the components reflected.

The cholesteric material is typically electrically switched to either one of two stable textures; planar or focal conic as described, for example, in the U.S. Pat. No. 5,453,863. In the planar texture, the director of the LC (direction of the long axis of the molecule) is uniformly parallel to the plane of the substrates across the cell but has a helical twist perpendicular to the plane of the substrates. It is the helical twist of the uniform planar texture that Bragg reflects light in a selected wavelength band. The focal conic texture contains defects that perturb the orientation of the liquid crystalline helices. In the typical focal conic texture, the defect density is high; thus the helical domain size becomes small and randomized in orientation such that it is just weakly scattering and does not reflect impinging light (i.e., it is essentially transparent to incident light). Once the defect structures are created, they are topologically stable and cannot be removed unless by some external force such as an electric field or melting the material out of the liquid crystalline phase to the isotropic. Thus, the focal conic texture remains stable and forward scatters light of all wavelengths into an absorbing (usually black) background. These bistable structures can be electronically switched between each other at rapid rates (on the order of milliseconds). Gray scale is also available within a single pixel through various switching schemes in order to adjust the density of reflective helical domains that are oriented perpendicular to the substrates (planar texture) to the randomized forward scattering domains (focal conic texture).

Bistable cholesteric liquid crystal displays have several electronic drive features that other bistable reflective technologies do not. For addressing a matrix of many pixels in a display, the characteristic of a voltage threshold is used. A threshold is used for multiplexing a row/column matrix without the need of an expensive active matrix (transistor at each pixel). Bistability with a voltage threshold allows very high-resolution displays to be produced with low-cost passive matrix technology. Gray scale capability allows stacked RGB, high-resolution displays with full-color capability where as many as 4096 colors have been demonstrated.

In a cholesteric liquid crystal display, the liquid crystal is typically sandwiched between two substrates that are spaced to a particular gap. The substrates can be either glass or plastic. The bottom substrate is painted with a light absorbing (black or colored) background. The cell gap is usually set by plastic or glass spacers that are either cylindrical or spherical in shape. In most cholesteric liquid crystal displays, the cell gap is not intentionally changed. If one presses on the top substrate of the cholesteric LCD, the liquid crystal can be displaced (since fluids are not very compressible) and induced to flow radially out of the area. Of principle interest is that when the focal conic texture of the cholesteric liquid crystal is induced to flow, the resulting texture is the planar state. The reflective planar state contrasts well to the dark focal conic background. This is a principle behind U.S. Pat. No. 6,104,448 "Pressure Sensitive Liquid Crystalline Light Modulating Device and Material," incorporated herein by reference in its entirety, which discloses that application of a mechanical stress to the liquid crystalline light modulating material changes an initial light scattering focal conic texture to the light reflecting planar texture. The U.S. Pat. No. 6,104,448 discloses a polymer network that is soluble with the chiral nematic liquid crystal and phase separates to form separated polymer domains that stabilize the thickness of the cell structure.

In the U.S. Pat. No. 6,104,448, an image can be written on the device with an untethered stylus or finger. The entire image is erased with the push of a button that applies a low voltage DC pulse to the cholesteric device. Other advantages of bistable cholesteric materials is that an image created on the writing pad display does not degrade with time and lasts indefinitely without application of an electric field, until erased. The time for erasing the entire image is less than a second, making the bistable cholesteric liquid crystal display a practical device for a writing pad. However, the device of the U.S. Pat. No. 6,104,448 completely erases the entire writing surface and does not erase selected portions of the image.

It would be desirable to have an electronic writing device whereby a selected portion of the image can be erased while retaining the remainder of the image. A pencil with a rubber eraser on paper and chalk with a cloth eraser on a chalk board have been unmatched in convenience by providing selectable erase. Likewise, a desirable feature of an electronic writing pad is selected erasure of the image accomplished with an untethered instrument such as a stylus.

SUMMARY OF THE INVENTION

In this invention we disclose a writing tablet or pad using bistable cholesteric liquid crystal technology that can be selectively erased. The disclosure describes writing tablet devices and methods for selectively erasing the tablet using an untethered stylus. The inventive selectively erasable writing tablet works in different Modes: Mode A, B and multimode (in the case of a multilayer device). In Mode A, the pressure of an instrument (e.g., an untethered pointed stylus) creates a transparent focal conic texture line on a colored planar texture background where all layers are switched to the planar texture. In Mode B, which is disclosed in prior art such as the U.S. Pat. No. 6,104,448, the stylus creates a colored planar texture line on a transparent focal conic background where all layers are switched to the focal conic texture. In multimode (for a multilayer device), the pressure of an instrument creates a colored planar texture line on a user selected colored texture background where the layers in the background can be either planar, focal conic or gray scale. In Modes A and B and multimode a gray scale reflective texture can be employed for the background and/or the written portion that has a reflectance between a maximum level of reflectance of the planar texture and a minimum level of reflectance of the focal conic texture. Gray scale can be formed by varying voltage or pressure as discussed in the Ser. No. 12/152,729 application. Contrast in the writing pad is created between the transparent focal conic texture which shows the light absorbing backlayer color or black and the reflective (color) planar and gray scale textures. We disclose how to selectively erase the writing tablet in Modes A, B, and multimode. While much of the following disclosure describes the invention in terms of the planar texture, it will be appreciated that the invention applies similarly to the use of a gray scale texture.

This invention takes advantage of the unique threshold electro-optic behavior of the bistable cholesteric liquid crystal material. We have discovered that pressure created by a stylus resulting in a decrease of the inner electrode spacing can both create and erase an image in Mode A, B or multimode depending upon whether or not a voltage is applied during the application of the pressure. Because of thresholds in the voltage response curve of the bistable cholesteric liquid crystal, a suitable voltage or sequence of voltage pulses applied to the electrodes drives the liquid crystal material in the depressed electrode region of pressure to the focal conic state; erasing any image at the location where pressure of the erasing stylus is applied. At other locations not depressed by the erasing stylus, where the voltage response curve is unshifted, the image remains unchanged. A selectively erasable writing device can employ buttons or switches that change the mode of the device to write images, selectively erase portions of an image, or fully erase all images from the display. An added advantage of this method of selective erasing is the low cost of the device since it only requires slight modification to the electronics to accommodate the different operational modes.

The inventive selectively erasable writing tablet can include stacked optically active layers (cholesteric liquid crystal layers). When a cell of one reflective color is stacked on top of another with a different reflective color one can draw different colors as selected by the user. A preferred embodiment for a full color writing tablet includes a stack of three active layers reflecting each of blue, green and red, from the top cell down or in any order, so that multi-color images are possible. Any image can be written to any layer (color) in the stack and any image can be selectively erased from any layer in the stack in either Mode A, B or multimode. Of course, the entire image can be erased and a new image drawn in either Mode A, B or multimode. In the inventive selectively erasable writing tablets, once a line of a selected color has been written on the tablet, additional lines of different colors can be drawn or erased, enabling a multi-color image to be produced or edited. Moreover, subsequent lines of different colors can be drawn or erased over existing color lines on the writing tablet to produce or edit different color images on the tablet.

Referring now to specific embodiments of the invention, a first embodiment features a selectively erasable electronic writing tablet. This includes a transparent, flexible writing surface. Electrically conductive layers are disposed below the writing surface; adjacent conductive layers are spaced apart by a gap. A layer of cholesteric liquid crystal material is disposed in the gap. Pressure applied to the writing surface decreases the gap. Circuitry includes:

a) a full erase function adapted to apply a full erase voltage to the conductive layers placing the liquid crystal layer in an initial planar or focal conic texture that is stable in an absence of an electric field, b) a write function adapted to form a written portion on the writing tablet during writing conditions, including applying the pressure to the writing surface, wherein the written portion includes a changed focal conic or planar texture different from the initial texture without affecting a texture outside of the written portion; and c) a select erase function adapted to selectively erase the written portion during select erasing conditions, including applying the pressure to an erasing region of the writing surface overlying the written portion, wherein the selectively erasing returns the changed texture to the initial texture without affecting a texture outside of the erasing region. A black or color light absorbing layer is located so as to absorb light passing through the liquid crystal layer.

As to specific features of the first embodiment, the full erase function can place the liquid crystal in the initial planar texture. Then the writing conditions apply a write voltage to the electrically conductive layers while the pressure is applied effective for placing the liquid crystal in the changed focal conic texture.

The select erasing conditions are the lack of applied voltage while the pressure is applied to the erasing region effective to return the changed texture to the planar texture.

In another variation, the full erase function places the liquid crystal in the initial focal conic texture. Then the writing conditions apply the pressure without applying a voltage to the electrodes effective to place the liquid crystal in the changed planar texture. The select erasing conditions apply a select erase voltage while the pressure is applied to the erasing region effective to return the changed planar texture to the focal conic texture.

Regarding further specific features, the select erase voltage and the write voltage can be applied continuously at a constant voltage or as a voltage pulse. The writing tablet can include an untethered stylus adapted to apply the pressure to the writing surface. The liquid crystal layer can include non-encapsulated cholesteric liquid crystal material dispersed in a polymer matrix. There can be two substrates between which the liquid crystal material is disposed, one of the substrates being formed of a flexible transparent material having an outer surface that forms the writing surface and one of the conductive layers closer to the writing surface being transparent. The conductive layers are patterned or unpatterned.

In a second embodiment, the conductive layers and liquid crystal layer form a cell. The writing tablet includes at least one additional cell stacked between the light absorbing layer and the writing surface. The cell can be bounded by opposing transparent substrates selected from the group consisting of: an outer substrate of the writing tablet, one of a pair of adjacent substrates separated by material matching the index of refraction of the adjacent substrates, and a substrate component having substrates with the conductive layers disposed on both sides thereof that are shared by adjacent cells, and combinations thereof. In each case a conductive layer is adjacent to or carried by a surface of a substrate.

As to more specific features of the second embodiment, the full erase function can place the liquid crystal layer of all cells in the initial planar texture, and then the writing conditions apply a write voltage to the electrically conductive layers for one or more of the cells while the pressure is applied effective to form the changed focal conic texture therein. The select erasing conditions are the lack of applied voltage while the pressure is applied to the erasing region effective to return the changed texture to the planar texture.

As another variation, the full erase function can place the liquid crystal of all of the cells in the initial focal conic texture. Then the writing conditions apply the pressure without applying a voltage to the electrodes for any of the cells effective to place the liquid crystal of the cells in the changed planar texture. The select erasing conditions apply a select erase voltage to the conductive layers for the cells while the pressure is applied to the erasing region effective to return the changed texture to the focal conic texture without changing the texture outside of the erasing region.

Referring to a third embodiment of the invention, a method of selectively erasing an electronic writing tablet includes providing the writing tablet comprising the transparent, flexible writing surface, the electrically conductive layers below the writing surface, and the layer of cholesteric liquid crystal material disposed in the gap. The liquid crystal is in the initial planar or focal conic texture that is stable in an absence of an electric field. Pressure applied to the writing surface decreases the gap. The black or color light absorbing layer is located so as to absorb light passing through the liquid crystal layer. A written portion is formed having a texture that is different than the initial texture. The written portion is selectively erased during select erasing conditions, including applying the pressure to an erasing region of the writing surface overlying the written portion. The selectively erasing returns the written portion texture to the initial texture without affecting a texture outside of the erasing region.

As to specific variations of the third embodiment, when the initial texture is the planar texture the select erasing conditions are the lack of applied voltage while the pressure is applied to the erasing region effective to return the written portion texture to the planar texture. When the initial texture is the focal conic texture the select erasing conditions are applying a select erase voltage while the pressure is applied to the erasing region effective to return the written portion texture to the focal conic texture.

Further, the invention can employ a gray scale texture having a reflectance between a maximum reflectance of the planar texture and a minimum reflectance of the focal conic texture. The initial texture can be a gray scale texture; and the written portion has a texture that is different than the gray scale initial texture. The selective erasing of the written portion during select erasing conditions includes applying the pressure to the erasing region to return the written portion texture to the initial gray scale texture without affecting a texture outside of the erasing region. In another variation, the written portion can have a gray scale texture. Further, the initial texture and written portion can both be in a gray scale texture or one of the initial texture and the written portion can be in a gray scale texture while the other is in a focal conic or planar texture. The above applies to a single or to stacked cells.

Further, when the writing tablet includes stacked cells, the written portion can be selectively erased including the steps of: retaining information as to the initial texture of each layer, applying the pressure to the erasing region while applying a suitable voltage to each layer based on the information sufficient to return the written portion texture to the initial texture in each layer while not affecting a texture of any of the layers outside of the erasing region.

Many additional features, advantages and a fuller understanding of the invention will be had from the accompanying drawings and the detailed description that follows. It should be understood that the above Summary of the Invention describes the invention in broad terms while the following Detailed Description describes the invention more narrowly and presents preferred embodiments that should not be construed as necessary limitations of the broad invention as defined in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

I. Single Layer Writing Tablet

Figure 1:
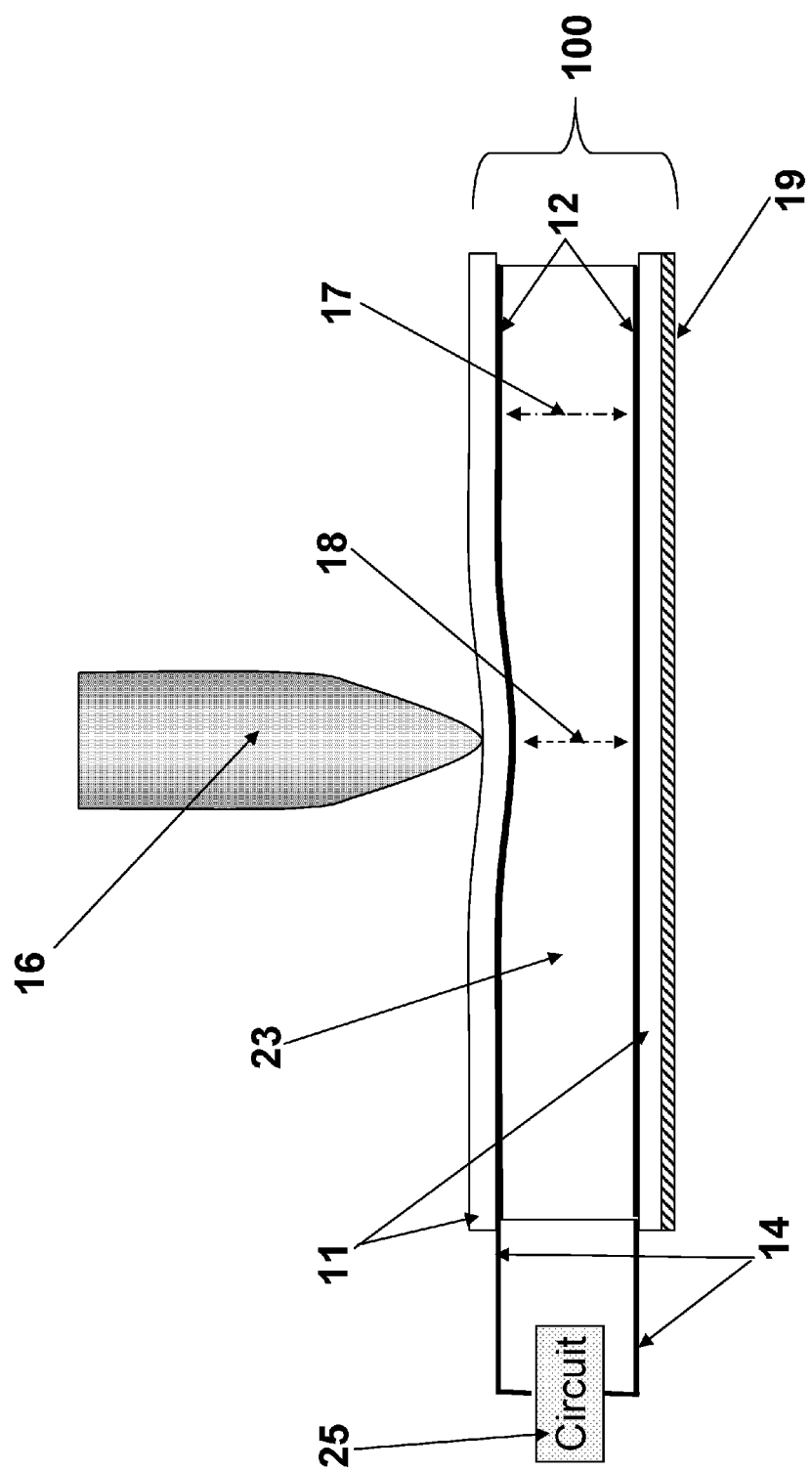
FIG. 1: Schematic illustration of a single layer selectively erasable writing pad device utilizing pressure of an untethered stylus to create or selectively erase an image.

A. Focal Conic Writing on a Planar Background, Mode A:

A first embodiment of the present invention is a selectively erased writing tablet in which the background state is the planar texture and the line created by the pressure of the stylus during application of voltage is in the focal conic texture. The line can be selectively erased by simply retracing it with the stylus with no voltage applied. The bistable cholesteric writing tablet is illustrated in FIG. 1 and includes substrates 11 of flexible material, plastic being preferred. The inner surfaces of the substrates are coated with transparent electrically conductive layers or electrodes 12 (preferably unpatterned but possibly patterned) from materials such an indium tin oxide (ITO) or a conducting polymer such as PEDOT. Sandwiched between the adjacent electrodes is a bistable cholesteric liquid crystal material 23.

In this embodiment in which the liquid crystal is initially in the planar texture, flow of the liquid crystal is not used for the inventive cell to form the focal conic texture using the pressure of a stylus in order to write. The droplets of liquid crystal are not encapsulated and are thus unconfined with interconnecting droplets. The dispersions may be of the type prepared by polymerization induced phase separation (PIPS) as is known in the art. The image is created by the unique electro-optic characteristics of the cell rather than by flow to be described later. The conductive electrodes 12 are connected with electrical interconnects 14 to electronic circuit 25 that provides suitable voltages to the conductive electrodes 12, usually in the form of a voltage pulse, in order for pressure of the stylus to create an image. The circuit 25 is first switched to operate in Mode A (focal conic writing on a planar background) and then the user can select the various functions; write, select erase, or full erase.

Figure 2:
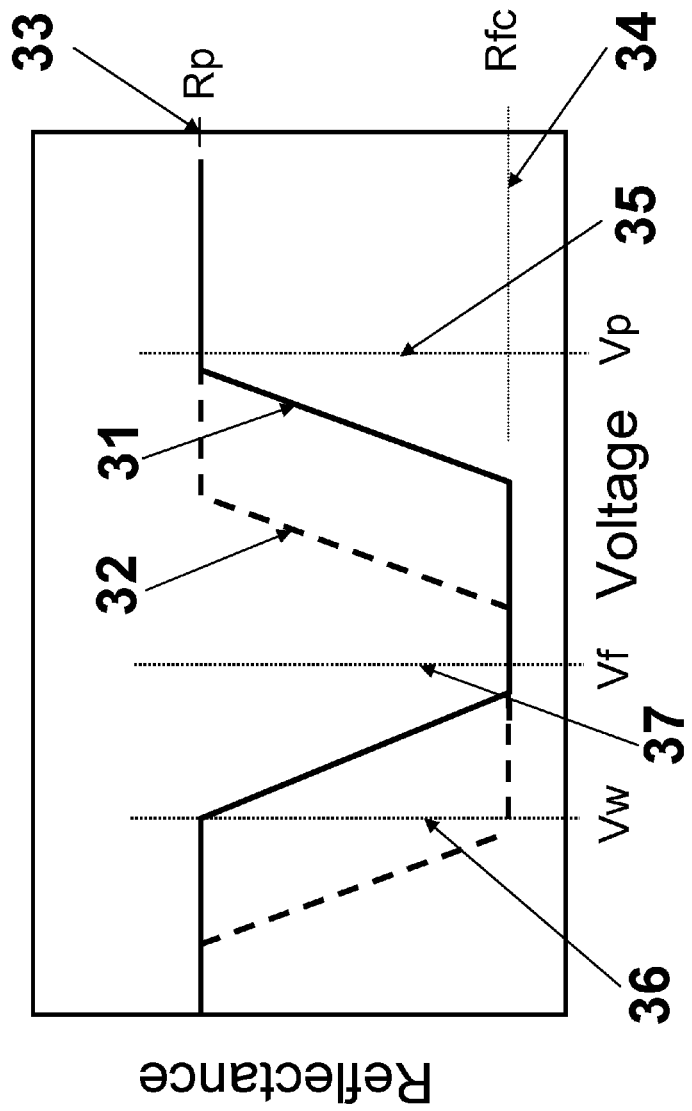
FIG. 2: Voltage versus reflection curves used to illustrate full and select erase voltages.

In order to explain the operation of the circuit 25 of FIG. 1 we turn to FIG. 2. FIG. 2 is an illustration of a typical voltage response shown as the Reflectance of the cell versus the Voltage of a pulse applied to the cell (shown in a form that is more uniform than an actual voltage response curve). There are two curves illustrated in the voltage response of FIG. 2: a solid curve 31 for the cell having an undepressed cell gap 17 and a dashed curve 32 for regions of the cell having a reduced cell gap spacing 18 (the undepressed and reduced cell gaps being shown in FIG. 1). In both the solid 31 and the dashed 32 curves of FIG. 2, the maximum light reflectance of the planar texture is indicated by Rp 33 whereas the minimum light reflectance of the focal conic texture is indicated by Rfc 34. The reflectance of the gray scale texture is between Rp and Rfc. As illustrated in FIG. 2 the effect of the pressure from the stylus is to shift the voltage response from the solid curve 31 to the dashed curve 32.

i. Mode A Full Erase:

The procedure of writing an image on the inventive cell in Mode A is to first fully erase all previous images by selecting the "Mode A full erase" function of the circuit 25. This applies an erasing voltage of value Vp indicated by vertical line 35 to drive the entire cell initially to the planar texture. The value of the voltage or magnitude of a voltage pulse to do this is well known in the art of a bistable cholesteric liquid crystal displays; e.g., U.S. Pat. Nos. 5,453,863 and 5,691,795, which are incorporated herein by reference in their entireties. This erases the writing tablet to the reflective planar texture so that the background color of the writing tablet is a color additive mixture of the reflective color of the cholesteric material 23 with any color of the back layer 19 of FIG. 1. In addition, it is understood that one might want to achieve a gray scale planar texture for full erase; therefore one can apply a Mode A full erase by erasing with a voltage value of V<Vp as indicated by the vertical line 35 in FIG. 2.

ii. Mode A Write

In order to write an image using stylus 16, one activates the "Mode A write" function on the circuit 25 such that a voltage, Vw, is applied to the writing tablet. The value of Vw is indicated by vertical line 36 of FIG. 2. The voltage is applied for the duration of the stylus write; preferably a continuous AC voltage or a sequence of bipolar pulses. The voltage is applied to the patterned or unpatterned electrodes so that the entire display area of liquid crystal seen by the user of the writing tablet, has an electric field applied to it. It is seen by curve 32 in FIG. 2 that a voltage Vw 36 will drive the area of the cell being written on to the focal conic texture; that is, areas of the cell under the stylus where pressure is applied and cell gap is reduced. The planar texture in that area is driven to the focal conic as illustrated by the dashed curve 32. In the remainder of the cell where the cell gap is not disturbed (e.g., regions 17), even though the electric field has been applied here, the material will remain in the planar texture as indicated by the solid curve 31, leaving a planar background for the focal conic written portion. In other words, the liquid crystal material where the cell gap is undisturbed remains in the planar texture as shown where line Vw intersects the solid line 31 (undepressed cell gap) while the voltage Vw is applied to the electrodes, and is not converted to the focal conic texture. An example of the inventive selectively erasable writing tablet cell operating in Mode A is photographed in FIG. 4. The circuit 25 can fully erase any image by selecting the "Mode A full erase" function to provide a planar erase voltage Vp 35 to the tablet. It is seen by FIG. 2 that a voltage Vp 35 will drive the entire cell to the planar texture, erasing the focal conic writing. The voltage may be an AC voltage pulse or a sequence of pulses, preferably bipolar pulses. In addition, one may desire to write a gray scale planar texture by applying a voltage during the write of V<Vw as line 36 indicated in FIG. 2.

iii. Mode A Select Erase:

In order to selectively erase an image using stylus 16, one activates the "Mode A select erase" function on circuit 25 such that no voltage is applied to the writing tablet. When a focal conic line is retraced with the stylus in select erase mode, the liquid crystal is displaced from the region under the stylus and is induced to flow from the focal conic texture to the planar texture. Thus, a focal conic line can be selectively or partially erased by applying pressure on an erasing region overlying the written portion for only a part of that line, which leaves the focal conic line where pressure was not applied. The selectively erased planar texture blends with the switched planar texture of the background such that the erased line does not contrast, as is evident in FIG. 5. The switched planar texture may be slightly different compared to the selectively erased planar texture, which favors judicious use of select erase or closely tracing the image when selectively erasing to avoid large selectively erased areas on the writing tablet where the differences may become more noticeable; the same is true for the switched focal conic texture compared to the selectively erased focal conic texture (see FIGS. 6 and 7). Note that the line of FIG. 4 underneath the text "Select Erase" was retraced without application of voltage while the tablet was in select erase mode and is barely visible in FIG. 5. To reduce contrast and to have the selectively erased region better match the background it might be preferable to have the planar texture background switched, for example, to a 95% gray scale planar texture.

References to writing "on a background" used in this disclosure means writing a color line on the writing tablet in which a majority of the display area has the background color or is black, and does not mean that the background must be physically behind the writing or formed by a color of the light absorbing back layer. When the word "image" is used in this disclosure it means any black or color line and any black or color background on the writing tablet. When we say "selecting a cell" or "writing on a cell" in this disclosure, that means selecting the writing color to include the color reflected by that cell.

B. Planar Writing on a Focal Conic Background, Mode B:

In this embodiment in which the liquid crystal is initially in the focal conic texture, flow of the liquid crystal is required to form the planar texture using the pressure of a stylus, without application of a voltage, in order to write. The image is created by the flow of the liquid crystal to the planar state. The conductive electrodes 12 are connected with electrical interconnects 14 to electronic circuit 25 that provides suitable voltages to the conductive electrodes 12, usually in the form of a pulse, in order to selectively or fully erase an image. The circuit 25 is first switched to operate in Mode B (planar writing on a focal conic background) and then the user can select the various functions; write, select erase, or full erase.

In order to explain the operation of the writing circuit 25 of FIG. 1 we refer to FIG. 2.

i. Mode B Full Erase:

The procedure of writing an image on the inventive cell in Mode B is to first fully erase all previous images by selecting the "Mode B full erase" function of the circuit 25. This applies an erasing voltage of value Vf indicated by vertical line 37 to drive the entire cell initially to the focal conic texture. The value of the voltage or magnitude of a voltage pulse to do this is well known in the art of a bistable cholesteric liquid crystal displays; e.g., U.S. Pat. Nos. 5,453,863 and 5,691,795. This erases the writing tablet to the mostly transmissive focal conic texture so that the background (black or a backcolor) of the writing tablet is due to revealing the back layer 19 of FIG. 1.

ii. Mode B Write:

In order to write an image using stylus 16 in Mode B, one activates the "Mode B write" function on the circuit 25 such that no voltage is applied to the writing tablet. In Mode B, which is disclosed in prior art such as the U.S. Pat. No. 6,104,448, the stylus creates a colored planar texture line on a transparent focal conic background. Contrast in the writing pad is created between the transparent focal conic texture which shows the back-coating 19 (typically black) and the reflective (color) planar texture of the cholesteric liquid crystal. An example of the inventive selectively erasable writing tablet cell operating in Mode B is photographed in FIG. 6. The write circuit 25 can fully erase any image by selecting the "Mode B full erase" function to provide a focal conic erase voltage Vf 37 to the tablet. It is seen by FIG. 2 that a voltage Vf 37 will drive the entire cell to the focal conic texture, erasing the planar writing. The voltage may be an AC voltage pulse or a sequence of pulses, preferably bipolar pulses.

iii. Mode B Select Erase:

In order to selectively erase an image using stylus 16, one activates the "Mode B select erase" function on circuit 25 such that a voltage Vw 36 is applied to the writing tablet. The voltage is applied for the duration of the pressure applied by the stylus; preferably a continuous AC voltage or a sequence of bipolar pulses. The voltage is applied to the patterned or unpatterned electrodes so that the entire display area of liquid crystal seen by the user of the writing tablet, has an electric field applied to it. It is seen by curve 32 in FIG. 2 that a voltage Vw 36 with applied pressure will selectively erase by driving that area of the cell to the focal conic texture; that is, areas of the cell under the stylus where pressure is applied and cell gap is reduced. The planar texture in that area is driven to the focal conic as illustrated by the dashed curve 32. In the remainder of the cell where the cell gap is not disturbed, even though the electric field has been applied there, writing on the cell in which the material is in the planar texture remains planar as indicated by the solid curve 31, leaving a focal conic background for the planar written portion. In other words, the planar writing where the cell gap is undisturbed remains in the planar texture as shown where line Vw intersects the solid line 31 (undepressed cell gap) while the voltage Vw is applied to the electrodes and is not converted to the focal conic texture. The regions of the writing tablet that are selectively erased to the focal conic texture blend with the switched focal conic texture of the background such that the erased line does not contrast, as is evident in FIG. 7. Note that the planar line of FIG. 6 underneath the planar text "Select Erase" was retraced while the tablet was in select erase mode and is barely visible in FIG. 7.

Figure 3:
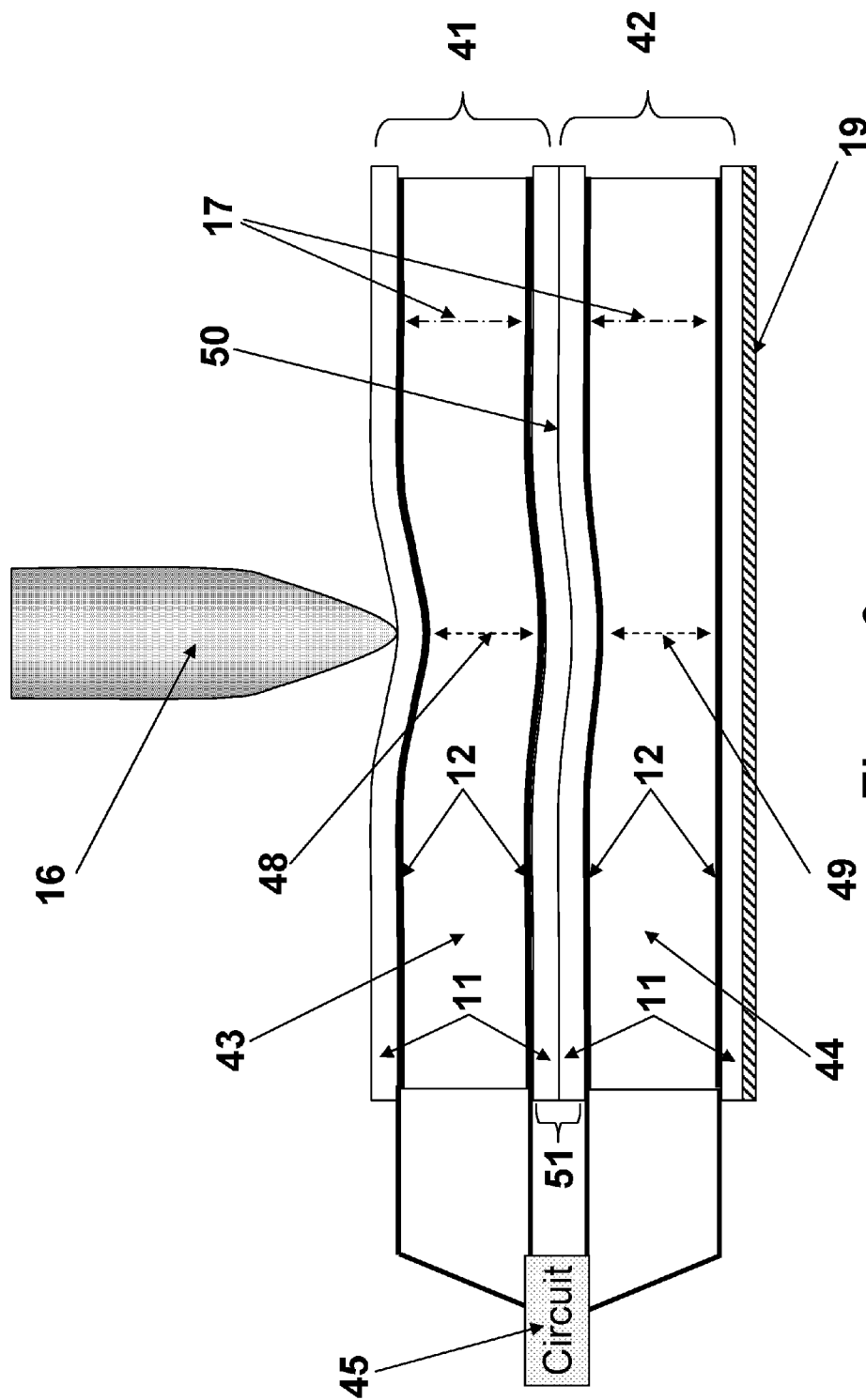
FIG. 3: Schematic illustration of a double layer selectively erasable writing pad device utilizing pressure of an untethered stylus to create or selectively erase an image.

II. Double Layer Writing Tablet:

We now turn to another embodiment of the invention featuring a multiple-color tablet in which two active layers are stacked over each other (FIG. 3). The active layers can be stacked such that each cell reflects a different planar reflective color and images can be written separately on each cell with a single stylus to create multiple color images on the writing tablet. Primary colors can be mixed to create a variety of colors subject to the innovation of the user. The writing tablet enables a single untethered stylus to write or draw figures in different colors as selected by the user. Writing of different colors can be achieved in at least two ways: a first Mode A in which planar color writing is presented on a planar texture background; and a second Mode B in which planar texture color writing is presented on a focal conic background, preferably black. Each of these modes works on a different physical principle of the cholesteric liquid crystal and will be described separately below.

The double cell writing tablet device can be made with either stacked separate cells or as a single unit sharing substrates. In FIG. 3, completed cells 41 and 42 comprising different color active layers can be stacked as separate units and joined with an index matching material 50 in between (matching the index of refraction of the adjacent transparent substrates). Alternatively, the stacked structure can be made as a single unit that shares a common substrate between the adjacent active layers 43 and 44 where the inner component structure 11, 50, and 11 becomes a single shared substrate 51 with two electrodes 12 disposed on either side (also including an upper and a lower substrate 11 and an upper and a lower, outer electrically conductive layer 12 sandwiching liquid crystal 43 and 44, respectively, adjacent the component structure.

A. Double Layer Writing Tablet: Focal Conic Writing on a Planar Background, Mode A:

In describing Mode A, we refer to FIG. 3 which is an illustration of a writing tablet having double stack cells. The multiple-color double-stack tablet of FIG. 3 is made up of two cells, cell 41 stacked on top of cell 42. Cell 41 is of the same construction as the cell of FIG. 1 containing transparent substrates 11 with transparent conductive electrodes 12; however the background coating 19 is absent and it is connected to single circuit 45. Cell 41 is stacked on top as well as optically coupled at 50 to cell 42 so as to match the index of refraction of adjacent substrates. One means of optical coupling is with a thin layer of optical index matching fluid 50 between cells 41 and 42. Cell 42 is also identical in construction to the cell of FIG. 1 with transparent substrates 11 and transparent conductive electrodes 12; however, cell 42 is painted with a background coating 19 and the electrodes of both Cell 42 and Cell 41 are electrically connected to same circuit 45. The circuit 45 is first switched to operate in Mode A (writing by forming a focal conic texture on a planar background in the cell) and then the user can select the various writing functions; write only cell 41, write only cell 42, write both cells 41 and 42, selectively erase both cells 41 and 42, or full erase.

Cells 41 and 42 are filled with a cholesteric liquid crystal material 43 and 44, respectively. However, the cholesteric material within each cell has a different reflective color than the other cell. For example, liquid crystal 43 may be a cholesteric material that reflects blue light while liquid crystal 44 reflects yellow light. In certain applications it may be desired that liquid crystal materials 43 and 44 have a different handedness for the helical twist; that is, one cell reflects right handed circular polarization and the other left. Like the cholesteric material 23 of FIG. 1, the cholesteric materials 43 and 44 of FIG. 3 are preferred to be in the form of a polymeric dispersion. Materials in a stacked cell assembly such as 43 and 44, are a droplet dispersion in which the droplets are unconfined with interconnecting droplets so that flow can affect its operation. The dispersions may be of the type prepared by polymerization induced phase separation as is known in the art.

i. Full erase, Mode A:

A procedure of writing a multicolor image on the double stack select erase tablet in Mode A is to first switch the circuit 45 to "Mode A full erase" function such that all previous images in both layers are planar erased by applying voltages of value Vp indicated by vertical line 35 (FIG. 2) to drive both cells 41 and 42 entirely into the planar texture. The voltage may be an AC voltage pulse or a sequence of pulses, preferably bipolar pulses. The value of the voltage or magnitude of a voltage pulse to do this is well known in the art of a bistable cholesteric liquid crystal displays; e.g., U.S. Pat. Nos. 5,453, 863 and 5,691,795. This erases the multi-color writing tablet to the reflective planar texture so that the background color of the writing tablet is a color additive mixture of the reflective colors of the cholesteric materials 41 and 42 and any color of the back layer 19.

ii. Write Only Cell 41, Mode A:

In order to write an image of the color of the cholesteric 43 on the top cell 41 by stylus 16 in Mode A, the circuit 45 is switched to "Mode A write only cell 41" function such that a voltage Vw is applied by the circuit 45 to the bottom cell 42 while no voltage is applied to the top cell 41 during the writing process. The value of Vw is indicated by vertical line 36 of FIG. 2. The voltage is applied for the duration of the stylus write; preferably a continuous AC voltage or a sequence of bipolar pulses. It is seen by curve 32 FIG. 2 that a voltage Vw 36 will drive the bottom cell to the focal conic texture only in the vicinity of the stylus where pressure is applied and the cell gap is reduced. This removes the planar texture of the liquid crystal 44 from the bottom cell 42 under the stylus (i.e., in reduced gap regions). In the remainder of the bottom cell 42 where the cell gap is not disturbed, the material will remain in the planar texture as indicated by the solid curve 31. Because no voltage is applied to the electrodes for the upper cell 41, the liquid crystal 43 of the upper cell is not changed from the planar texture. This forms an image composed of a written portion (region where pressure is applied by the stylus to the writing surface) containing only the reflected light of the color of the cholesteric 43 of top cell 41 (added with any color of the back layer, referred to throughout this disclosure as a "back color") on a background color (formed by the undepressed (unwritten) regions of both cells) that is an additive mixture of the colors of the planar textures of both cells (along with any back color).

iii. Write Only Cell 42, Mode A:

In order to write an image of the color of the cholesteric liquid crystal 44 of the bottom cell 42 by stylus 16 in Mode A, the circuit 45 is switched to "Mode A write only cell 42" function such that a voltage Vw is applied by the write circuit 45 to the electrodes of the top cell 41 and no voltage is applied to electrodes of the cell 42 while the writing pressure is applied to the writing surface. The value of Vw is indicated by vertical line 36 of FIG. 2. The voltage is applied for the duration of the stylus write; preferably a continuous AC voltage or a sequence of bipolar pulses. It is seen by curve 32 of FIG. 2 that a voltage Vw 36 will drive the cholesteric 43 of the top cell 41 to the focal conic texture in the vicinity of the stylus where pressure is applied (i.e., at the written portion of the writing tablet) as the cell gap is reduced. In the remainder of the top cell where the cell gap is not disturbed, the material will remain in the planar texture as indicated by the solid curve 31. Therefore, the image will be composed of the written portion formed by colored light reflected from the planar texture of the cholesteric 44 of only the bottom cell 42 (added to any color of the back layer). The written portion will be apparent on a background color (formed by the undepressed regions of both cells) that is an additive mixture of the colors of the planar textures of both cells (along with any background color).

iv. Write Both Cells 41 and 42, Mode A:

In order to write by forming the focal conic texture that exhibits the backcolor 19 on the planar background of Mode A, the circuit 45 is switched to "Mode A write both cells 41 and 42" function such that a voltage Vw is applied by the write circuit 45 to both the top cell 41 and bottom cell 42 while the writing pressure is applied to the writing surface. The value of Vw is indicated by vertical line 36 of FIG. 2. The voltage is applied for the duration of the stylus write; preferably a continuous AC voltage or a sequence of bipolar pulses. It is seen by curve 32 FIG. 2 that a voltage Vw 36 will drive the cholesteric liquid crystal of both cells to the focal conic texture in the vicinity of the stylus where pressure is applied (i.e., at the written portion of the writing tablet) as the cell gap is reduced. In the remainder of both cells where the cell gap is not disturbed, the material will remain in the planar texture as indicated by the solid curve 31. The image will be composed of the written portion formed by the backcolor on a background color (formed by the undepressed regions of both cells) that is an additive mixture of the colors of the planar textures of both cells (along with the backcolor).

v. Selectively Erase Both Cells 41 and 42, Mode A:

A mistake or change in writing can be locally corrected or made in a stacked cell assembly much the same way it is done in a single cell writing tablet; that is, over-writing to produce the background where the written portion was. In this disclosure we define the word erase to mean: removing the written image by restoring the original background color. In a stacked cell assembly, one would not, with this definition, selectively erase only cell 41 without perturbing the image that was already recorded into cell 42 and vice-versa. A mistake or change is locally corrected or made by selectively erasing both layers simultaneously by restoring the written portion to the background color. In order to selectively erase both cells 41 and 42 in Mode A, the circuit 45 is switched to "Mode A selective erase both cells 41 and 42" function such that no voltage is applied by the write circuit 45 to either the top cell 41 or the bottom cell 42 while the writing pressure is applied to the writing surface to retrace the previously written focal conic lines and flow (erase) them to a planar state. The selectively erased planar texture blends with the switched planar texture of the background such that the erased line does not contrast. For example, if an image is composed of only the planar texture of cell 41 (with cell 42 being focal conic in the written portion), retracing the written portion without applied voltage places the focal conic regions of cell 42 in the planar texture. The region of the previously written portion is selectively erased to that of the planar texture on both cells and does not contrast with the switched planar background of both cells.

B. Double Layer Writing Tablet: Planar Writing on a Focal Conic Background, Mode B:

In describing Mode B, we again refer to FIG. 3. The writing tablet is identical to that described above except that the initial state of both cells is focal conic and the cholesteric materials are in the form of a polymeric dispersion that will allow localized flow caused by the writing pressure from a pointed instrument such as a pointed untethered stylus to induce the planar texture. Droplets that are unconfined or are interconnecting allow liquid crystal flow to occur under the pressure of the stylus 16 in reduced cell gap regions 48 and 49. Flow does not occur and the liquid crystal texture does not change in undepressed regions 17. The pressure from the pointed stylus 16 in the locally reduced cell gap spacing 48, 49 induces flow in the cholesteric material that changes the cholesteric texture from the transparent focal conic to the color reflective planar texture in the vicinity of the tip of the stylus 16. The stylus is used to draw an image similar to drawing with a pencil on paper. The written image can then be entirely erased by applying a voltage pulse to the electrodes of sufficient value to drive all the material 13 to the focal conic state (see FIG. 2 and the '448 patent for suitable voltage to apply to each liquid crystal layer). The circuit 45 is first switched to operate in Mode B (a cell having planar writing on a focal conic background) and then the user can select the various writing functions; write only cell 41, write only cell 42, write both cells 41 and 42, selectively erase both cells 41 and 42, or full erase.

i. Full erase, Mode B:

The procedure of writing an image on the inventive cell in Mode B is to first fully erase all previous images by selecting "Mode B full erase" such that the write circuit 45 erases both layers to the focal conic by applying a voltage Vf 37 to both of cells 41 and 42. The value of the voltage or magnitude of a voltage pulse to do this is well known in the art of bistable cholesteric liquid crystal displays; e.g., U.S. Pat. Nos. 5,453, 863 and 5,691,795. When viewed from above, the tablet will exhibit the background coating 19 (backcolor or black) since the focal conic texture is essentially transparent in this cell configuration. Black or blue are often preferred for the back layer 19.

ii. Write Only Cell 41, Mode B:

In order to write an image reflecting the color of the cholesteric liquid crystal 43 on the top cell 41 only using stylus 16 "Mode B write only cell 41" function is selected such that a voltage Vw is applied by the write circuit 45 to the electrodes of the bottom cell 42 during the writing process but no voltage is applied to the electrodes of the top cell 41. The value of Vw is indicated by vertical line 36 of FIG. 2. The voltage is applied for the duration of the stylus write; preferably a continuous AC voltage or a sequence of bipolar pulses. The purpose of the voltage is to maintain the focal conic texture of the bottom cell 42 under the action of the stylus (i.e., prevent forming the planar texture in the written portion or depressed cell gap region of the bottom cell). While this voltage is applied the pressure of the stylus does not induce a planar texture in cell 42 but maintains its focal conic texture during the writing process. The stylus does, however, induce a planar texture in the cholesteric 43 of the upper cell 41 in its vicinity (i.e., in the writing portion) that is believed to be due to lateral flow of the cholesteric liquid crystal in the reduced gap regions resulting in the focal conic texture being transformed to the planar texture. This occurs without any voltage being applied to the upper cell. Therefore, an image on a focal conic background on a stacked multicolor cell is possible by suitably applying a voltage to allow the image to be written on only one cell. The image is composed of the writing portion at a color of the light reflected from the planar texture of the cholesteric liquid crystal 43 of the top cell 41 (added to any color of the back layer) on the unwritten and undepressed background (black or a back color of the back layer).

iii. Write Only Cell 42, Mode B:

Similarly, in order to form an image on the bottom cell 42 only by stylus 16 "Mode B write only cell 42" function must be selected such that a voltage Vw must be applied by the write circuit 45 to the electrodes of the top cell 41 during the writing process but no voltage is applied to the electrode of the bottom cell 42. As before, both cells are initially in the focal conic texture. The value of Vw is indicated by vertical line 36 of FIG. 2. The voltage is applied for the duration of the stylus write; preferably a continuous AC voltage or a sequence of bipolar pulses. The purpose of the voltage is to maintain the focal conic texture of the top cell 41 under the action of the stylus. While this voltage is applied the pressure of the stylus does not induce a planar texture in top cell 41 but maintains its focal conic texture from the erasure process. The stylus does, however, induce a planar texture in the bottom cell 42 due to induced lateral flow of the cholesteric liquid crystal (without applying voltage to the bottom cell), resulting in the focal conic texture being transformed to the planar texture in the reduced cell gap region of the bottom cell (i.e., in the written portion). This produces an image composed of the writing portion at a color of the light reflected from the planar texture of the cholesteric 44 bottom cell 42 (added to any color of the back layer) on the unwritten and undepressed background (black or a back color of the back layer).

iv. Write Both Cells 41 and 42, Mode B:

In order to write on both stacked cells in Mode B, the circuit 45 is switched to "Mode B write both cells 41 and 42" mode such that no voltage is applied by the write circuit 45 to either the top cell 41 or the bottom cell 42 while the writing pressure is applied to the writing surface. The stylus does, however, induce a planar texture in the cholesterics 43 and 44 of both cells 41 and 42 in its vicinity (i.e., in the writing portion) that is believed to be due to lateral flow of the cholesteric liquid crystal in the reduced gap regions resulting in the focal conic texture being transformed to the planar texture. This occurs without any voltage being applied to the cell by the circuit 45. The image is composed of the writing portion at a color of the light reflected from the planar texture of the cholesteric liquid crystal 43 added to the light reflected from the planar texture of the cholesteric liquid crystal 44 (added to any color of the back layer) on the unwritten and undepressed background (black or a back color of the back layer).

v. Selective Erase Both Cells 41 and 42, Mode B:

A mistake or change in writing can be locally corrected or made in a stacked cell assembly much the same way it is done in a single cell writing tablet; that is, over-writing to produce the background where the written portion was. Again, the word erase means removing the written image by restoring the original background color. In a stacked cell assembly, one would not, with this definition, selectively erase only cell 41 without perturbing the image that was already recorded into cell 42 and vice-versa. A mistake or change is locally corrected or made by selectively erasing both layers simultaneously by restoring the written portion to the background color. In order to selectively erase both cells 41 and 42 in Mode B, the circuit 45 is switched to "Mode B select erase both cells 41 and 42" function such that a voltage Vw is applied by the write circuit 45 to the electrodes of the both cells 41 and 42 during the writing process. The value of Vw is indicated by vertical line 36 of FIG. 2. The voltage is applied for the duration of the stylus write; preferably a continuous AC voltage or a sequence of bipolar pulses. The purpose of the voltage is to form the focal conic texture in both cells 41 and 42 under the action of the stylus (i.e., replace the planar texture in the written portion or depressed cell gap region of the bottom cell). The region in which the planar texture has been selectively erased to the focal conic texture blends with the switched focal conic texture of the background such that the erased line does not contrast.

C. Double Layer Writing Tablet: Any Color on Any Color Background, Multimode:

The inventive writing tablet can also be designed so that one of the cells operates according to Mode A and the other cell operates according to Mode B. That is, one cell has an initial planar texture while the other cell has the initial focal conic texture. Writing in a color of only one of the cells (added to any back color) is selected by applying the write voltage Vw to the other cell while writing pressure is applied. The background will have the color of the undepressed regions of the planar cell (added to any back color). For example, when a first cell desired to be selected is in the initial focal conic texture, the other second cell in the initial planar texture has the writing voltage Vw applied during the writing process. The planar texture is erased from the second layer in the written portion where the cell gap is reduced, as Vw is applied. The writing process forms the planar texture in the written portion of the first layer where the cell gap is reduced. The resulting image will be the written portion at the planar texture of the first layer only (added to any background color) on a background formed by the planar texture of undepressed regions of the second layer (added to any background color).

Another way to form an image on the multimode, two layer writing tablet is by applying the write voltage to both cells, in effect, selecting the background. Upon writing, the planar texture is prevented from being formed in the written portion of the focal conic layer and the planar texture is erased to the focal conic in the written portion of the planar layer. This forms an image composed of a written portion in black or any back color on a background of the color reflected by the planar layer (added to any background color).

Yet another way to form an image on the multimode, two layer writing tablet is by not applying the write voltage to either layer. The writing process will form the planar texture in the written portion of the initially focal conic layer and will not affect the planar texture existing in the written portion of the other initially planar layer. This will result in an image that is the addition of the colors reflected from both layers in their written portions (along with any back color) on a background that is the color of light reflected from the planar layer (added to any back layer color).

The writing tablet can be made to produce white on black or black on white using a two cell writing tablet reflecting blue and yellow and having a black back layer. To produce white on black, Mode B is used (both cells are initially in the focal conic state) and no write voltage is applied. This results in the written portion being white (additive mixing of the blue and yellow colors reflected from both cells) on the black back layer seen through the undepressed regions of both cells. To produce black on white, Mode A is used; both cells are initially in the planar texture. During the writing process, the write voltage is applied to both cells. This results in written portions of both cells being focal conic, which shows the black back layer on a background that is white (the additive mixture of the blue and yellow reflected colors).

To selectively erase in the multimode configuration, circuit 45 must be able to retain information of the original color of the multimode. In doing so, the voltages for each layer are adjusted accordingly. For example, in a blue and yellow double layer writing tablet if one chooses a blue background color and one wants to selectively erase a line back to the blue background color, one simply retraces the written line while circuit 45 applies no voltage to the blue layer and Vw to the yellow layer. The multimode select erase simply reproduces the original color of the multimode background selection.

III. Multilayered Writing Tablets Composed of More than Two Layers:

It will be understood that the select erase capability of this invention applies to writing tablets having three or more stacked cholesteric liquid crystal layers. Once written portions have been formed on the writing tablet in Mode A, Mode B or Multimode in the three active layer writing tablet disclosed in the Ser. No. 12/152,729 application, one skilled in the art will understand in reading this disclosure that they can be selectively erased as described herein, particularly with regard to the double layer stacked display. In all cases the written portions, formed in any manner described in the Ser. No. 12/152,729 application as incorporated herein by reference, are selectively erased by returning the written portion texture to a texture similar to the switched initial texture of the background whereby contrast in minimized.

In all embodiments of the invention, the substrates and electrically conductive layers (e.g., electrodes) are preferably optically transparent, with the possible exception of the substrate and electrically conductive layer nearest to the light absorbing layer, which can be opaque. The electrically conductive layers preferably have their indices of refraction matched to the substrates and, when the substrate component is used, the adjacent substrates have their indices of refraction matched to each other with the index matching material.

The electronic circuits 25 and 45 are designed so as to carry out the operation of Mode A, Mode B and Multimode and the various functions described in this disclosure for one or more optically active cholesteric liquid crystal layers. This design is well within the ability of one of ordinary skill in the art in reading this disclosure. Therefore, only general electronic circuitry has been described above and in the examples.

The invention will now be described by reference to the following examples that are not intended to limit the scope of the invention.

EXAMPLE 1

A bistable cholesteric writing tablet 100 (FIG. 1) was fabricated to demonstrate the inventive effect of utilizing the characteristics of the voltage response curve to write an image with the pressure of an untethered stylus comprising a written portion in the focal conic texture on a planar texture background. A writing tablet cell with a 4 micron cell gap was constructed from 2 substrates and an active layer. The top substrate was constructed from a 5 mil hardcoated thick Polyethylene Terephthalate (PET) (MacDermid, Inc.) and the bottom substrate consisted of a 7 mil PET (Piedmont Plastics, Inc.). Both substrates were coated with an unpatterned electrode made from a Meyer rod coated PEDOT-based conducting polymer (AGFA) that covered the entire surface area of the interior surface of both substrates. The active layer consisted of a polymer-dispersed yellow (580 nm) cholesteric liquid crystal (Merck).

The active layer of the writing tablet is made from a blend of polymerizable monomer (prepolymer) and cholesteric liquid crystal. The dispersion was created by non-encapsulating polymerization induced phase separation of a cholesteric liquid crystal using monomer chemistry similar to what is described in U.S. Pat. No. 7,351,506, which is incorporated herein by reference in its entirety. The active layer of the writing tablet was made from using a UV curable methacrylate-based monomer, acrylate-based cross-linker, diphenyl photoinitiator, and 4 micron spherical polyvinylidine spacers. The mixture consisted of:

75% (wt.) KLC19 (Kent Displays, Inc.) cholesteric liquid crystal premixed to selectively Bragg reflect yellow light at the desired peak reflective wavelength of 580 nm 25% (wt.) photo-polymerizable monomer consisting of Functionality=1.3:

81.6% (wt.) methyl methacrylate 14.7% (wt.) trimethylolpropane triacrylate 2.0% (wt.) Irgacure 651 (Ciba Specialty Chemicals)

1.7% (wt.) lauryl methacrylate

The spherical plastic spacers were added to the system at 3% (wt.) of the total weight of the liquid crystal/monomer mixture. The mixture was than laminated between the two conductive polymer coated PET substrates. The system was cured by exposure to UV light at 1.62 mW/cm$^2$ irradiance for 15 minutes. After curing the polymerizable mixture, the cell was backpainted black and then laser-singlulated (as described in US Patent Application Publication 2007/0277659A1, incorporated herein by reference in its entirety) to the desired shape.

Electrical connections were made with high purity conductive silver paint (SPI Supplies), attached to both the top and bottom ledge where the conductive polymer electrode is exposed. The 7 mil PET film on the back of the display was painted with a black paint. A function generator (Analogic Polynomial Waveform Synthesizer Model 2020) and amplifier (Kepco BOP500M) were connected to the silver electrodes of the writing tablet using alligator clips visible in FIG. 4. The function generator and amplifier were used to supply a voltage waveform sufficient to switch the LC material. The waveform and magnitude of the voltage pulse to switch the display are well known in the art of a bistable cholesteric liquid crystal displays; e.g., U.S. Pat. Nos. 5,453,863 and 5,691,795. In all cases, information was written to the display using a standard plastic stylus with a ~1 mm radius tip.

Figure 4:
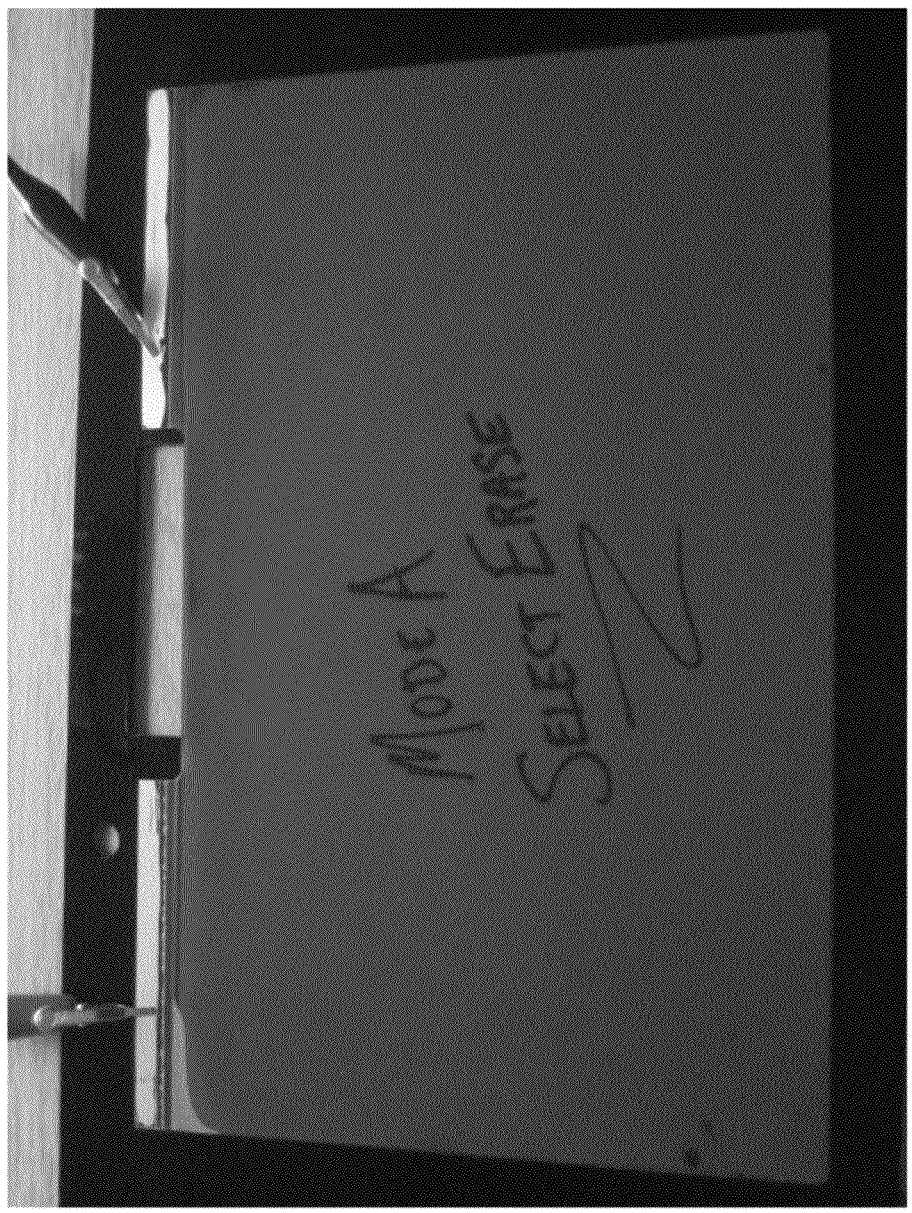
FIG. 4: Image written in Mode A on a single layer selectively erasable writing pad.

In FIG. 4, we can see the writing tablet in Mode A. Before writing, the display was switched to the planar state $V_p$=40.5V (10 ms, 50 pulses) to erase any pre-existing information. Next the display was scanned at a writing voltage $V_w$=10V (5 ms, 1000 pulses) while writing in "Mode A" using the stylus. Then it was scanned at a writing voltage $V_w$=10V (5 ms, 1000 pulses) while writing "Select". Finally, it was scanned at $V_w$=10V (5 ms, 1000 pulses) while writing "Erase" and the line underneath the text.

Figure 5:
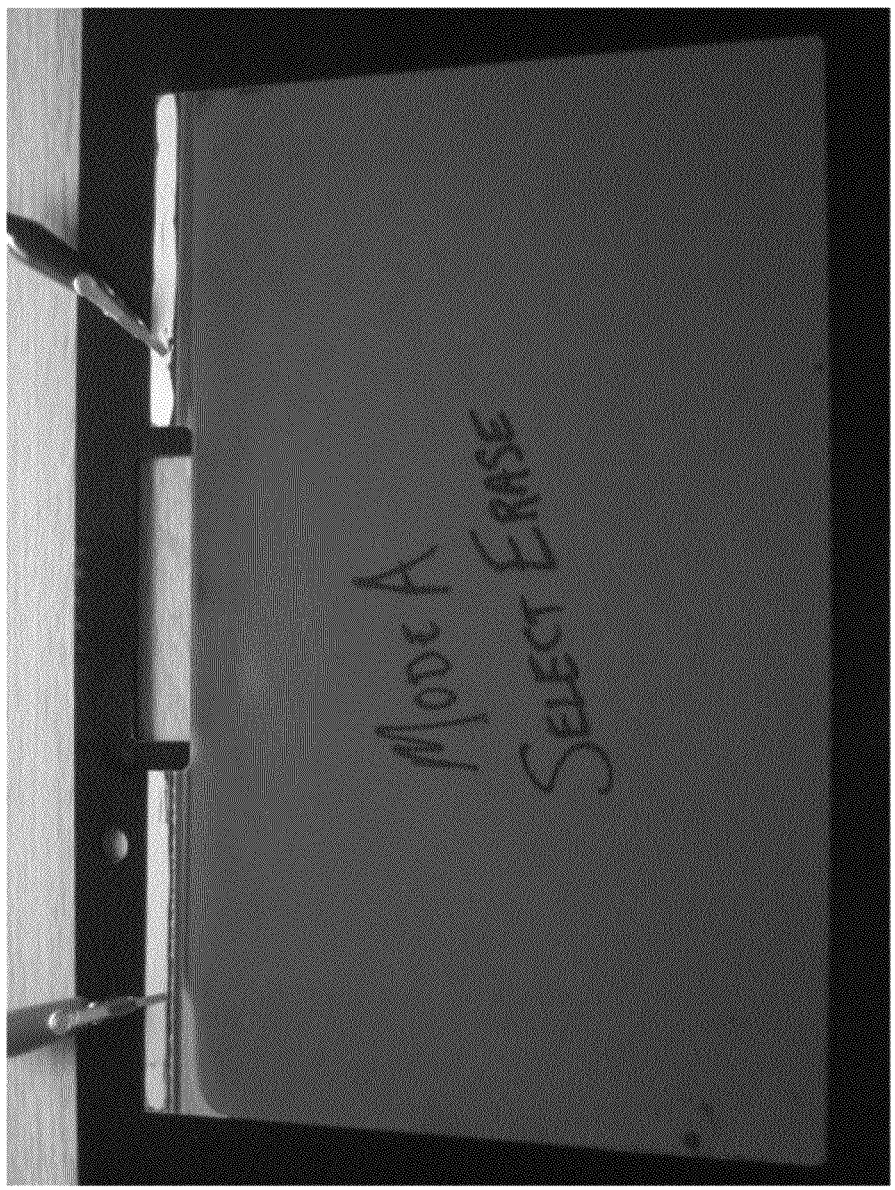
FIG. 5: Image on the writing pad of FIG. 4 selectively erased.

In FIG. 5, we can see the line underneath the text in FIG. 1 was selectively erased. To achieve this, with no voltage applied, the line was re-traced using the stylus which effectively re-wrote the previously focal conic line to the planar state thereby blending in with the surrounding planar texture of Mode A. The selectively erased line under the text is barely visible in FIG. 5. Note that the text "Mode A Select Erase" was not disturbed during this process as the voltage $V_w$ is below the threshold voltage sufficient to switch the display to the homeotropic state (thereby inducing the planar texture).

EXAMPLE 2

Figure 6:
FIG. 6: Image written in Mode B on a single layer selectively erasable writing pad.

In FIG. 6, we can see the writing tablet from Example 1 switched to Mode B. Before writing, the display was switched to the focal conic state $V_{fc}$=18V (10 ms, 50 pulses) to erase any pre-existing information. Next "Mode B Select Erase" was written on the display including a line underneath the text while applying no voltage.

Figure 7:
FIG. 7: Image on the writing pad of FIG. 6 selectively erased.

In FIG. 7, we can see the line underneath the text in FIG. 6 was selectively erased. This select erase of the line was achieved by applying a scanning voltage of $V_w$=9.5V (10 ms, 500 pulse), while re-tracing the line underneath the text with the stylus. It took 3 $V_w$ scans to erase the image while retracing as the scans only lasted 5 seconds each. During the $V_w$ scan and write, the liquid crystal underneath the stylus is re-written from the planar state back to the focal conic because of the reduced cell gap (and subsequently increased electric field). The selectively erased line under the text is barely visible in FIG. 7. Note that the text "Mode B Select Erase" was not disturbed during this process as the voltage $V_w$ is below the threshold voltage sufficient to switch the display out of the planar state.

EXAMPLE 3

A double stack multiple color writing tablet, as schematically shown in FIG. 3 with both cells in Mode A was constructed using the same polymer dispersions as in Example 1, with the exception of different concentration of chirals in the cholesteric liquid crystals of cell 41 and cell 42 to achieve different colors. A first or upper cell 41 was constructed identical to the writing tablet cell of Example 1 with a 4 micron cell gap spacing except that the cholesteric liquid crystal (Merck) was selected to be one that Bragg-reflects blue light at a peak wavelength of approximately 470 nm. Furthermore, no background coating was placed on the upper cell so that all of the incident visible light that was not reflected by the cholesteric material of the first cell passed through it. A second cell 42 was constructed identical to the writing tablet cell of Example 1 with a 4 micron cell gap spacing and with the cholesteric liquid crystal that reflects yellow light at a peak wavelength of approximately 580 nm. The second cell contained a black background coating 19. The first cell was fixedly stacked on top of the second cell with a few drops of mineral oil in between adjacent substrates of the cells to serve as an optical index matching material 50. Electrical connections to the displays were made with an electrically conductive woven silver tape (Adhesives research), attached to both the top and bottom ledges of both cells where the conductive polymer electrode is exposed. A function generator (Analogic Polynomial Waveform Synthesizer Model 2020) and amplifier (Kepco BOP500M) were connected to the conductive silver tape of the cells using alligator clips.

To operate in Mode A, the cells were first erased to the planar state by applying a 50V, 100 ms pulse with a 10 ms period bipolar square to the electrodes of the top and bottom cells. With these pulses both cells were switched to the planar texture and the writing tablet exhibited a white reflective color as the blue color of the top cell and yellow color of the bottom cell additively mixed to yield white. A black image was then written on the stacked multicolor tablet by applying a continuous 6V square wave voltage $V_w$ with a 10 ms periodicity to the electrodes of both the top 41 and bottom 42 cells. The image was then selectively erased by simply retracing the black focal conic writing with the stylus while applying no voltage. The stylus induced a planar texture in both layers as it traced the line causing the line to appear erased. The erased line was of low contrast such that it was difficult to notice against the switched planar background.

EXAMPLE 4

We constructed a multiple color writing tablet of Mode B using a double stack writing tablet schematically depicted in FIG. 3. In this Example we used the same double stacked writing tablet of Example 3 except that it was switched to operate in Mode B. The writing tablet was first erased to the focal conic texture by applying a 20V, 100 ms pulse with a 10 ms period bipolar square to the electrodes of the top cell and of the bottom cell. With these pulses both cells were switched to the focal conic texture and the writing tablet exhibited a black reflective color since the focal conic texture is transparent revealing the black color of the background coating 19 of the bottom cell.

A white image was then written to both cells 41 and 42 of the stacked multicolor tablet by the pressure of a pointed stylus without applied voltage. The image was selectively erased by retracing the image using a continuous 6V square wave voltage Vw with a 10 ms periodicity to both the top and bottom cell electrodes. The selectively erased focal conic texture blended with the surrounding focal conic background texture such that the line exhibited little to no contrast and appeared erased.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A selectively erasable electronic writing tablet comprising:
    a transparent, flexible writing surface;
    electrically conductive layers below said writing surface, adjacent said conductive layers being spaced apart by a gap;
    a layer of cholesteric liquid crystal material disposed in said gap, wherein pressure applied to said writing surface decreases said gap;
    circuitry including:
        a) a full erase function adapted to apply a full erase voltage to said conductive layers placing said liquid crystal layer in an initial planar or focal conic texture that is stable in an absence of an electric field,
        b) a write function adapted to form a written portion on said writing tablet during writing conditions, including applying said pressure to said writing surface, wherein said written portion includes a changed focal conic or planar texture different from said initial texture without affecting a texture outside of said written portion;
        c) a select erase function adapted to selectively erase said written portion during select erasing conditions, including applying said pressure to an erasing region of said writing surface overlying said written portion, wherein said selectively erasing returns said changed texture to said initial texture without affecting a texture outside of said erasing region; and
    a black or color light absorbing layer located so as to absorb light passing through said liquid crystal layer.

2. The writing tablet of claim 1 wherein said full erase function places said liquid crystal in said initial planar texture, and then said writing conditions apply a write voltage to said electrically conductive layers while said pressure is applied effective for placing said liquid crystal in said changed focal conic texture.

3. The writing tablet of claim 2 wherein said select erasing conditions are the lack of applied voltage while said pressure is applied to said erasing region effective to return said changed texture to said planar texture.

4. The writing tablet of claim 2 wherein said write voltage is applied continuously at a constant voltage or as a voltage pulse.

5. The writing tablet of claim 1 wherein said full erase function places said liquid crystal in said initial focal conic texture, and then said writing conditions apply said pressure without applying a voltage to said electrodes effective to place said liquid crystal in said changed planar texture.

6. The writing tablet of claim 5 wherein said select erasing conditions are applying a select erase voltage while said pressure is applied to said erasing region effective to return said changed planar texture to said focal conic texture.

7. The writing tablet of claim 6 wherein said select erase voltage is applied continuously at a constant voltage or as a voltage pulse.

8. The writing tablet of claim 1 comprising an untethered stylus adapted to apply said pressure to said writing surface.

9. The writing tablet claim 1 wherein said liquid crystal layer includes said nonencapsulated cholesteric liquid crystal material dispersed in a polymer matrix.

10. The writing tablet of claim 1 comprising two substrates between which said liquid crystal material is disposed, one of said substrates being formed of a flexible transparent material having an outer surface that forms said writing surface and one of said conductive layers closer to said writing surface being transparent.

11. The writing tablet of claim 1 wherein said conductive layers are patterned or unpatterned.

12. The writing tablet of claim 1 wherein said conductive layers and said liquid crystal layer form a cell, said writing tablet including at least one additional said cell stacked between said light absorbing layer and said writing surface.

13. The writing tablet of claim 12 wherein each said cell is bounded by opposing transparent substrates selected from the group consisting of: an outer substrate of the writing tablet, one of a pair of adjacent substrates separated by material matching the index of refraction of said adjacent substrates, and a substrate component having substrates with said conductive layers disposed on both sides thereof that are shared by adjacent said cells, and combinations thereof.

14. The writing tablet of claim 12 wherein said full erase function places said liquid crystal layer of all of said cells in said initial planar texture, and then said writing conditions apply a write voltage to said electrically conductive layers for one or more of said cells while said pressure is applied effective to form said changed focal conic texture therein.

15. The writing tablet of claim 14 wherein said select erasing conditions are the lack of applied voltage while said pressure is applied to said erasing region effective to return said changed texture to said planar texture.

16. The writing tablet of claim 12 wherein said full erase function places said liquid crystal of all of said cells in said initial focal conic texture, and then said writing conditions apply said pressure without applying a voltage to said electrodes for any of said cells effective to place said liquid crystal of said cells in said changed planar texture.

17. The writing tablet of claim 16 wherein said select erasing conditions are applying a select erase voltage to said conductive layers for said cells while said pressure is applied to said erasing region effective to return said changed texture to said focal conic texture without changing said texture outside of said erasing region.

18. A method of selectively erasing an electronic writing tablet comprising:
providing said writing tablet comprising a transparent, flexible writing surface, electrically conductive layers below said writing surface, adjacent said conductive layers being spaced apart by a gap, and a layer of cholesteric liquid crystal material disposed in said gap, said liquid crystal being in an initial planar or focal conic texture that is stable in an absence of an electric field, wherein pressure applied to said writing surface decreases said gap, and a black or color light absorbing layer located so as to absorb light passing through said liquid crystal layer;
forming a written portion having a texture that is different than said initial texture; and
selectively erasing said written portion during select erasing conditions, including applying said pressure to an erasing region of said writing surface overlying said written portion, wherein said selectively erasing returns said written portion texture to said initial texture without affecting a texture outside of said erasing region.

19. The method of claim 18 wherein when said initial texture is said planar texture said select erasing conditions are the lack of applied voltage while said pressure is applied to said erasing region effective to return said written portion texture to said planar texture, and wherein when said initial texture is said focal conic texture said select erasing conditions are applying a select erase voltage while said pressure is applied to said erasing region effective to return said written portion texture to said focal conic texture.

20. The method of claim 18 comprising using a gray scale texture having a reflectance between a maximum reflectance of said planar texture and a minimum reflectance of said focal conic texture.

21. The method of claim 20 wherein said initial texture is said gray scale texture, including
forming said written portion having a texture that is different than said gray scale initial texture;
wherein said selective erasing of said written portion during select erasing conditions includes applying said pressure to said erasing region to return said written portion texture to said initial gray scale texture without affecting a texture outside of said erasing region.

22. The method of claim 20 wherein said written portion has said gray scale texture.

23. The method of claim 20 wherein said initial texture and said written portion can both be in said gray scale texture or one of said initial texture and said written portion can be in said gray scale texture while the other is in said focal conic or said planar texture.

24. The method of claim 18 wherein said conductive layers and said liquid crystal layer form a cell, said writing tablet including at least one additional said cell stacked between said light absorbing layer and said writing surface, selectively erasing said written portion including:
retaining information as to said initial texture of each said layer, and
applying said pressure to said erasing region while applying a suitable voltage to each said layer based on said information sufficient to return said written portion texture to said initial texture in each said layer while not affecting a texture of any of said layers outside of said erasing region.

* * * * *